Patented Jan. 22, 1952

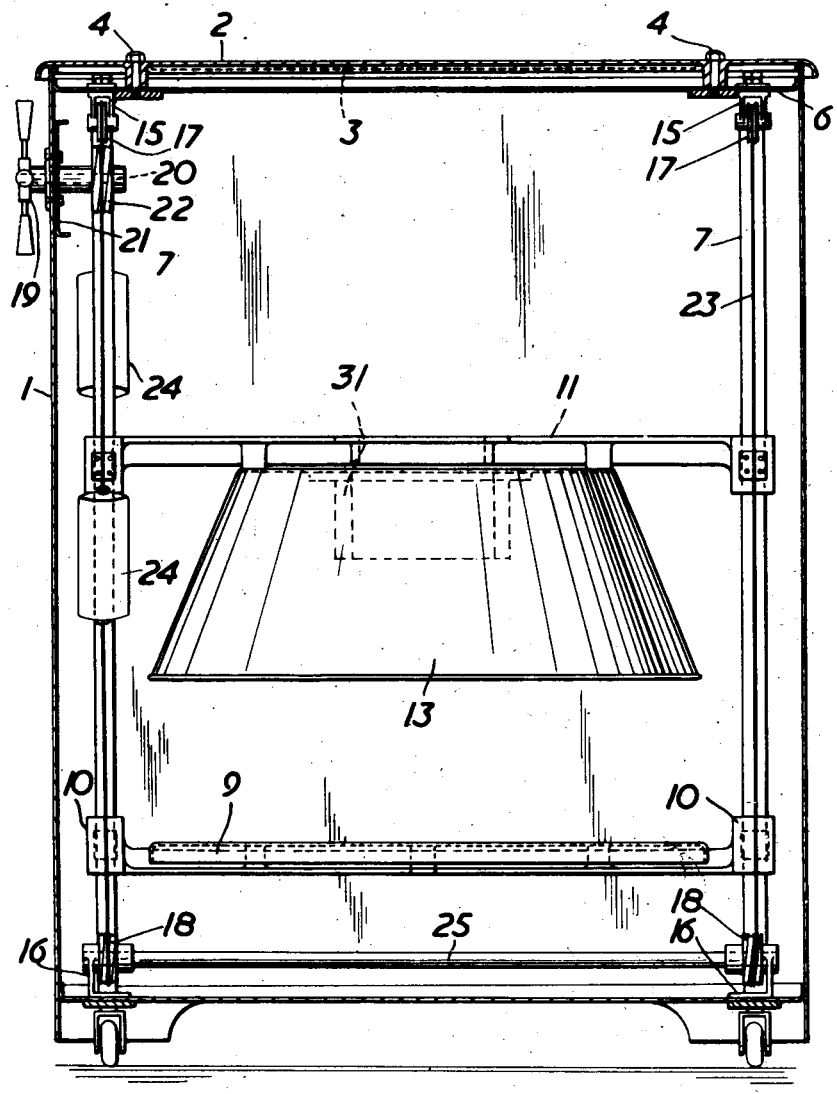

2,583,409

UNITED STATES PATENT OFFICE 2,583,409

EPISCOPIC OPTICAL PROJECTION APPARATUS

Hugh Villiers Briscoe and Robert Cecil Byng, London, England, assignors to Grant Production Company Limited, London, England, a British company Application August 25, 1949, Serial No. 112,256
In Great Britain August 27, 1948

5 Claims. (Cl. 88—24)

This invention relates to optical apparatus and is more particularly concerned with an apparatus of the episcope type by which there may be produced upon a projection screen an image of printed matter or other object placed upon a platform, the image on the screen being magnified or reduced in size in regard to the natural size of the object as desired. The invention has for its object to provide an apparatus of this form which is convenient in use and which can be used for a large variety of purposes.

According to the invention there is provided an optical apparatus of the type described above having a casing and a lighting unit wherein a lens carrier and an object mounting platform are movable relative to each other within the casing along a common axis to vary the size and adjust the focus of an image projected onto a screen mounted in the casing.

Figure 1:
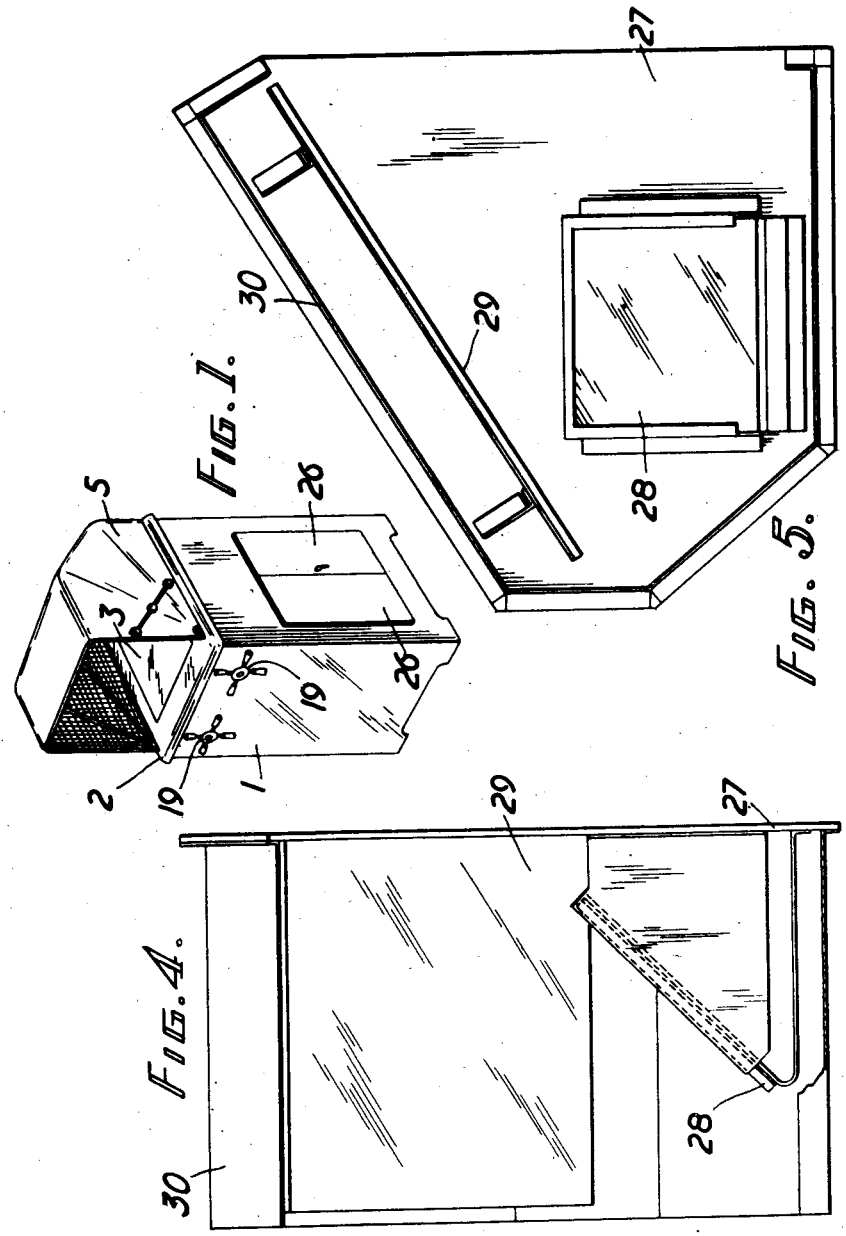
Figure 2:
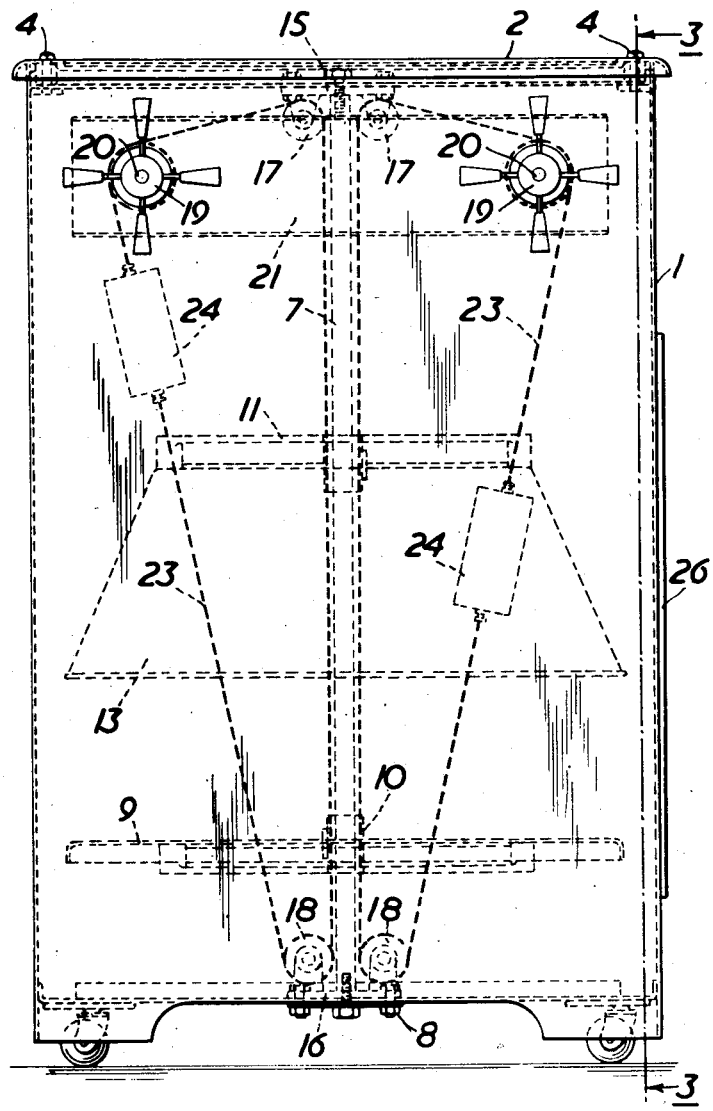

The invention will now be described with reference to the accompanying drawings which illustrate by way of example a preferred embodiment of the invention, and in which:

Figure 1 is a perspective view of the apparatus;
Figure 2 is a front elevational view of the optical apparatus with the hood removed;
Figure 3 is a sectional view on the line 3—3 of Figure 2;
Figure 4 is a side elevation of the mirror unit;
Figure 5 is a plan view of the mirror unit shown in Figure 3.

The optical system of the apparatus is enclosed in a rectangular casing 1 provided with a top cover plate 2 which supports a ground glass screen 3 the cover being secured at each corner by bolts 4. The top of the casing 1 is fitted with a tray 6 which is secured to the cover plate 2 and supported on a pair of vertical guide bars 7 which are secured to the casing at their lower ends by locknuts 8.

The objects, whose images are to be projected on the screen, are placed on a light metal platform 9 provided with end portions 10 which are bored to receive and slide upon the guide bars 7 to enable the platform to be moved bodily up or down in the casing. A second platform of similar dimensions is slidably mounted on the guide rails and functions as a lens carrier 11, a lens (not shown) being mounted in its central part. A bellows (not shown) extends between the lens and the margins of the ground glass screen 3. In order to provide the necessary illumination of objects placed on the platform 9 a lighting unit is detachably mounted beneath the lens carrier 11 and consists of a light diffusing reflector 13 of spun aluminium which houses a ring of electric lamps (not shown), the electrical connection to which is made by a detachable plug and socket connection. In order to protect that part of the lens which is adjacent the ring of electric lamps from excessive heat and to prevent light from directly reaching the lens, a circular sleeve of heat insulating material 31 is positioned between the reflector and the lens. The detachable fitting of the lighting unit to the lens carrier is effected by spring loaded bayonet connectors consisting of bayonet slots upon the lighting unit adapted to be connected by spring loaded and shaped projections on the lens carrier, these projections preferably being shaped so as to facilitate the coupling of the lighting unit to the lens carrier 11.

The object platform 9 and the lens carrier 11 are movable upwardly or downwardly by a cable system operated by external hand wheels. Each guide bar 7 carries a bearing bracket 15 at its upper end and a similar bearing bracket 16 at its lower end. On each of these brackets guide pulleys 17 and 18 are respectively mounted. A pair of hand wheels 19 project outside the casing and are mounted on shafts 20 supported on a backing plate 21. The end of each of the shafts 20 is provided with a multiple grooved pulley 22 in alignment with the guide pulleys mounted on the brackets 15 and 16. Both the object platform 9 and the lens carrier 11 are fixed to separate loops of Bowden cable 23 which extend round each set of upper and lower guide pulleys, two or three turns being coiled around the pulleys 22. The ends of each cable loop are anchored in cylindrical counterweights 24 which balance the weights of the object platform and the lens carrier 11 and their associated parts. Thus by rotation of one of the hand wheels 19 it is possible for the operator to adjust the position of the lens to vary the size of the image projected on the ground glass screen.

The platform 9 is similarly adjustable by rotation of the other handwheel in order that the image may be brought properly into focus at the desired degree of enlargement. The wire loops 23 and counterweights 24 may be duplicated on the other side of the casing and the pulleys adjacent opposite sides of the casing may be coupled by shafts, such as at 25, extending across the width thereof.

A detachable hood 5 of fabric or other suitable material may be mounted above the casing to protect the image on the screen from external light for viewing purposes, and is formed by a series of U-shaped arms covered with dark material and pivoted together at the extremities thereof so as to be readily collapsible.

Access to the platform 9 is obtained by doors 26 fitted in one side of the casing.

For the purpose of projecting an image of an external object onto the platform and thence to the screen an auxiliary mirror unit is provided (constructed as shown in Figure 5). This mirror unit is adapted to be placed on the platform 9 or attached to the lens carrier 11 for the purpose of reflecting the light through a right angle to produce image reversal.

The mirror unit comprises a base 27, adapted to rest on the platform 9, and having secured thereon a plane mirror 28 and a secondary mirror 29 each inclined at a suitable angle to both a horizontal and vertical plane. A wall 30 serves to shield the unit against stray light such as might be reflected from the internal walls of the casing. In use, light from an external object is reflected from mirror 29 to mirror 28 and then through the lens in lens carrier 11. The accessory of the apparatus includes a platform unit upon which objects may be placed and which can be moved to and from the main apparatus by wheels provided upon it. The platform unit may also include a vertical wall to form a background for objects placed upon the platform unit.

To illuminate such an object the lighting unit within the main apparatus may be detached and supported over the object on the platform unit and a stand may be provided to support the lighting unit in this way.

When the apparatus is being used for the projection of objects upon the platform unit in this way the operation is the same as before except that the control wheel for the platform carrier is supplemented in use by moving the platform unit to and from the main apparatus. The platform unit may be so shaped as to be stored adjacent the main apparatus with the horizontal portion of the platform unit underneath the main apparatus and the vertical wall of the platform unit adjacent the one side of the main apparatus.

What we desire to claim by Letters Patent is:

1. An optical projection apparatus of the episcope type comprising in combination a casing open at the top end and adapted to rest with its lower end upon a base, a viewing screen horizontally mounted on the casing so as to form the top cover thereof, an object mounting platform, lens carrier means, a light unit, vertically disposed guide tracks mounted within the casing and slidably guiding said platform and said lens carrier means, the said lens carrier means being positioned between the screen and the platform for reflecting the image of an object placed on the platform upon the screen, the said light unit being positioned to illuminate said object, and cable and pulley means interconnecting the platform and the lens carrier means for varying the vertical distances thereof relative to each other and to the screen, thereby focusing the lens carrier means and adjusting the size of the reflected image.

2. An optical projection apparatus as defined in claim 1, wherein said cable and pulley means include counterweights balanced so as to retain the platform and the lens carrier means in adjusted positions, said pulley means being attached to the casing.

3. An optical projection apparatus as defined in claim 2, wherein hand wheels are mounted on the outside of said casing, said hand wheels comprising pulleys operatively engaging said cable means for actuating said cable and pulley means.

4. An optical projection apparatus as defined in claim 1, wherein said light unit comprises a source of light, a light diffusing reflector disposed so as to reflect the light of said source of light upon an object, and a sleeve of heat insulating material positioned to shield the lens carrier means against the heat of said source of light.

5. An optical projection apparatus as defined in claim 1, wherein a foldable open hood is mounted on the top of the casing in a position shielding the screen.

HUGH VILLIERS BRISCOE.
ROBERT CECIL BYNG.

REFERENCES CITED

The following references are of record in the file of this patent:

UNITED STATES PATENTS

| Number | Name | Date |
| --- | --- | --- |
| 1,199,942 | Taylor | Oct. 3, 1916 |
| 1,306,861 | Sparkes | June 17, 1919 |
| 2,186,330 | Fitzgerald | Jan. 9, 1940 |
| 2,341,042 | Hill | Feb. 8, 1944 |
| 2,409,328 | Wilder | Oct. 15, 1946 |
| 2,411,514 | Blanc | Nov. 26, 1946 |
| 2,472,098 | Duncan | June 7, 1949 |
| 2,474,055 | Lacey | June 21, 1949 |